US008830327B2

United States Patent
Tink et al.

(10) Patent No.: US 8,830,327 B2
(45) Date of Patent: Sep. 9, 2014

(54) SURVEILLANCE SYSTEM WITH DIRECT DATABASE SERVER STORAGE

(75) Inventors: Edsel James Tink, North Gower (CA); Yves Van Der Elst, Louisville, KY (US); Victor Gottardi, Ottawa (CA)

(73) Assignee: Honeywell International Inc., Morristown, NJ (US)

( * ) Notice: Subject to any disclaimer, the term of this patent is extended or adjusted under 35 U.S.C. 154(b) by 374 days.

(21) Appl. No.: 13/086,930

(22) Filed: Apr. 14, 2011

(65) Prior Publication Data

US 2011/0279678 A1 Nov. 17, 2011

Related U.S. Application Data

(60) Provisional application No. 61/334,199, filed on May 13, 2010.

(51) Int. Cl.
*H04N 5/33* (2006.01)
*G08B 13/196* (2006.01)
*H04N 7/18* (2006.01)
*H04N 5/247* (2006.01)

(52) U.S. Cl.
CPC .......... *H04N 7/181* (2013.01); *G08B 13/19645* (2013.01); *G08B 13/19693* (2013.01); *H04N 5/247* (2013.01)
USPC ........... 348/159; 348/160; 348/161; 348/162; 348/163; 348/164; 348/165; 348/166; 348/167; 348/168; 348/169; 348/170; 348/171; 348/172

(58) Field of Classification Search
CPC ....... H04N 7/181; H04N 5/232; H04N 5/247; G08B 13/19645; G08B 13/19693
USPC ......................................................... 348/159
See application file for complete search history.

(56) References Cited

U.S. PATENT DOCUMENTS

| 6,839,705 | B1 * | 1/2005 | Grooters .............................. 1/1 |
| 7,131,136 | B2 * | 10/2006 | Monroe ......................... 725/105 |
| 7,657,330 | B2 * | 2/2010 | Morrison ........................ 700/19 |
| 8,218,871 | B2 * | 7/2012 | Angell et al. ................. 382/181 |
| 8,316,052 | B2 * | 11/2012 | Hao et al. ...................... 707/783 |
| 8,345,935 | B2 * | 1/2013 | Angell et al. ................. 382/117 |
| 2002/0032027 | A1 * | 3/2002 | Kirani et al. .................. 455/426 |
| 2002/0170064 | A1 * | 11/2002 | Monroe et al. ................ 725/105 |
| 2003/0122667 | A1 * | 7/2003 | Flynn ........................... 340/540 |
| 2004/0008253 | A1 * | 1/2004 | Monroe ......................... 348/143 |
| 2004/0052450 | A1 * | 3/2004 | Morrison ........................ 385/24 |

(Continued)

FOREIGN PATENT DOCUMENTS

WO WO 03/001809 A1 1/2003

OTHER PUBLICATIONS

European Search Report, dated Jan. 31, 2012, corresponding to Application No. EP 11 16 5019.

*Primary Examiner* — Andy Rao
*Assistant Examiner* — Shan Elahi
(74) *Attorney, Agent, or Firm* — Husch Blackwell LLP

(57) ABSTRACT

A video surveillance system includes at least one of a camera or a streamer. A data base server is coupled to the camera and can store metadata for a video clip from the camera or streamer. A media storage server is coupled to both the camera or, the streamer, and to the data base server to store the clip in the absence of any network video recorders.

15 Claims, 5 Drawing Sheets

(56) References Cited

U.S. PATENT DOCUMENTS

| | | | |
|---|---|---|---|
| 2004/0220791 A1* | 11/2004 | Lamkin et al. | 703/11 |
| 2004/0220926 A1* | 11/2004 | Lamkin et al. | 707/3 |
| 2005/0068417 A1* | 3/2005 | Kreiner et al. | 348/143 |
| 2005/0216580 A1* | 9/2005 | Raji et al. | 709/223 |
| 2006/0204207 A1* | 9/2006 | Gilge | 386/46 |
| 2006/0259588 A1* | 11/2006 | Lerman et al. | 709/219 |
| 2007/0043608 A1* | 2/2007 | May et al. | 705/10 |
| 2007/0107028 A1* | 5/2007 | Monroe et al. | 725/105 |
| 2007/0150336 A1* | 6/2007 | Boily | 705/13 |
| 2007/0282908 A1* | 12/2007 | Van der Meulen et al. | 707/104.1 |
| 2007/0286369 A1* | 12/2007 | Gutt et al. | 379/127.01 |
| 2009/0027495 A1* | 1/2009 | Oskin et al. | 348/143 |
| 2009/0167859 A1* | 7/2009 | Alberth, Jr. | 348/143 |
| 2009/0226043 A1* | 9/2009 | Angell et al. | 382/115 |
| 2009/0232357 A1* | 9/2009 | Angell et al. | 382/103 |
| 2009/0268024 A1* | 10/2009 | Tsukuda et al. | 348/143 |
| 2010/0013931 A1 | 1/2010 | Golan et al. | |

* cited by examiner

SURVEILLANCE SYSTEM WITH DIRECT DATABASE SERVER STORAGE

CROSS-REFERENCE TO RELATED APPLICATION

This application claims the benefit of the filing date of U.S. Provisional Application Ser. No. 61/344,199 filed May 13, 2010 and entitled "IP Surveillance System With Direct Database Server Storage". The '199 application is hereby incorporated herein by reference.

FIELD

The application pertains to systems for obtaining video and audio data from large numbers of IP cameras and streamers and storing such data for subsequent retrieval. More particularly, the application pertains to such systems which eliminate a need for network video recorders.

BACKGROUND

Network Video Recorders (NVRs) are known software systems that provide a centralized service to record, search, retrieve and manage digital video and audio data typically using commercial off-the-self computing platforms and traditional file-based storage systems. As those of skill in the art would understand, the video and audio data can be obtained from a variety of sources, such as members of a plurality of cameras or streamers. The cameras can be part of a regional, security monitoring system.

NVRs are limited by their computing platform's capacity to receive and transmit video and audio data, capacity to store in memory pre-event recorded video and audio data, capacity to communicate with storage systems, and the scalability of file-based storage systems. These limitations all contribute to a low density ratio of cameras to NVRs (tens of cameras to one NVR).

FIG. 1 illustrates a known system configuration. Audio and video from cameras or streamers are coupled, wired or wirelessly via a selected protocol, for example an internet (IP) protocol, to one of a plurality of NVRs. High-end security installations with 100s to 1000s of cameras require 10s to 100s of NVRs resulting in complex and expensive systems and a high cost of ownership.

One known solution, illustrated in FIG. 2, reduces some of the physical system cost by consolidating NVR platforms using virtualization to fewer high-end computing platforms. However, the number of hosted NVRs remains and does little to reduce the system management costs.

In another solution, illustrated in FIG. 3, IP Cameras communicate directly with "off-the-shelf" Storage Area Networks (SAN) via the Internet Small Computer System Interface (iSCSI) protocol to thereby try to eliminate the need for powerful NVR servers. However, these SANs only provide low-level block based storage and thus a dedicated file system will be required within each IP Camera making centralized data access and management complex and difficult to achieve. Additionally, systems as in FIG. 3 also retain complex SAN storage architectures that have proven to be difficult to manage.

Object based storage systems scale beyond traditional file based systems to 10s of Petabytes of capacity and billions of files as a single repository namespace that dramatically simplifies systems and their management. NVRs are, however, unable to fully exploit Object based storage systems as only the capacity of data storage is addressed. The need for powerful computing platforms still exists to perform their remaining functions and addressing the issues of systems management only produces limited improvement.

DETAILED DESCRIPTION

Figure 1:
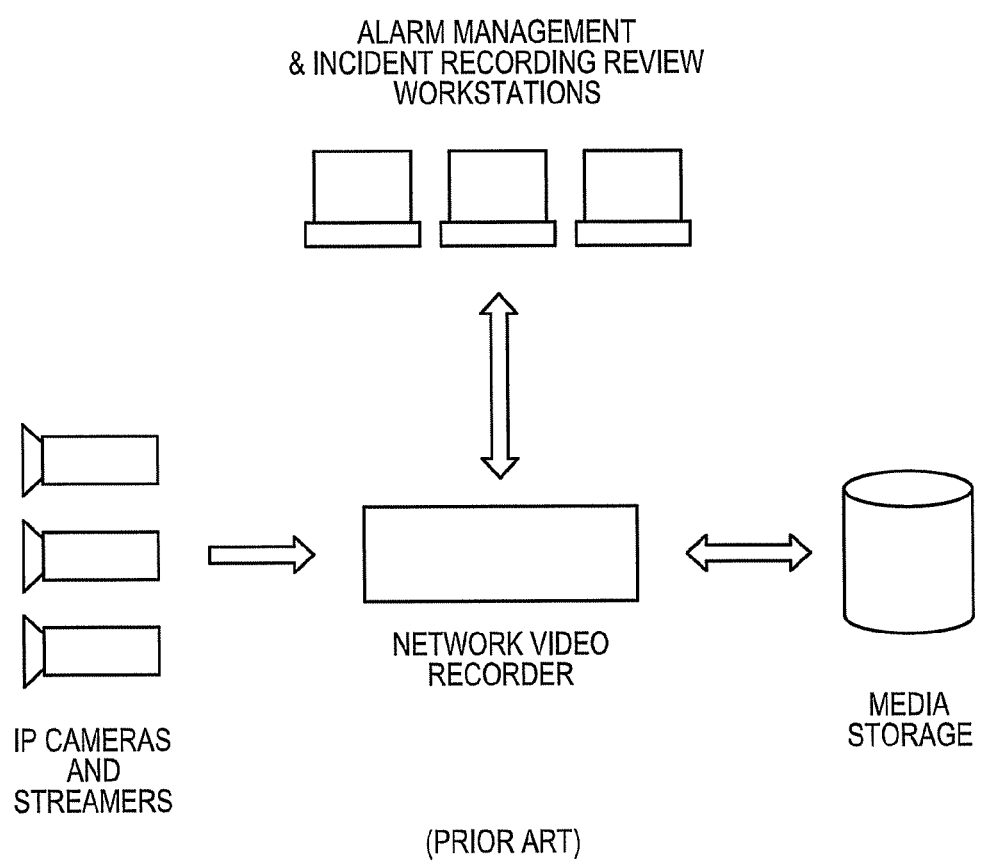
FIG. 1 is a block diagram of a known network video recorder system.
Figure 2:
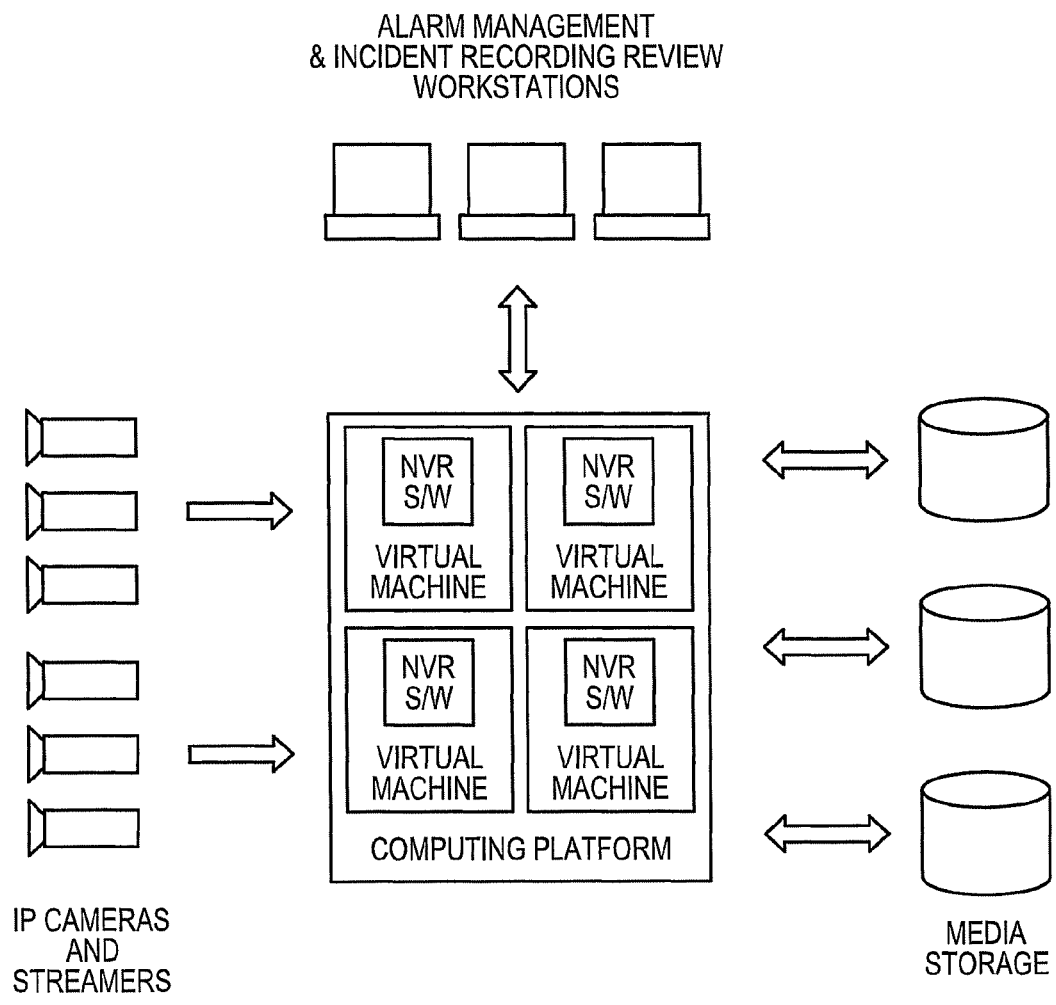
FIG. 2 is a block diagram of another known system.
Figure 3:
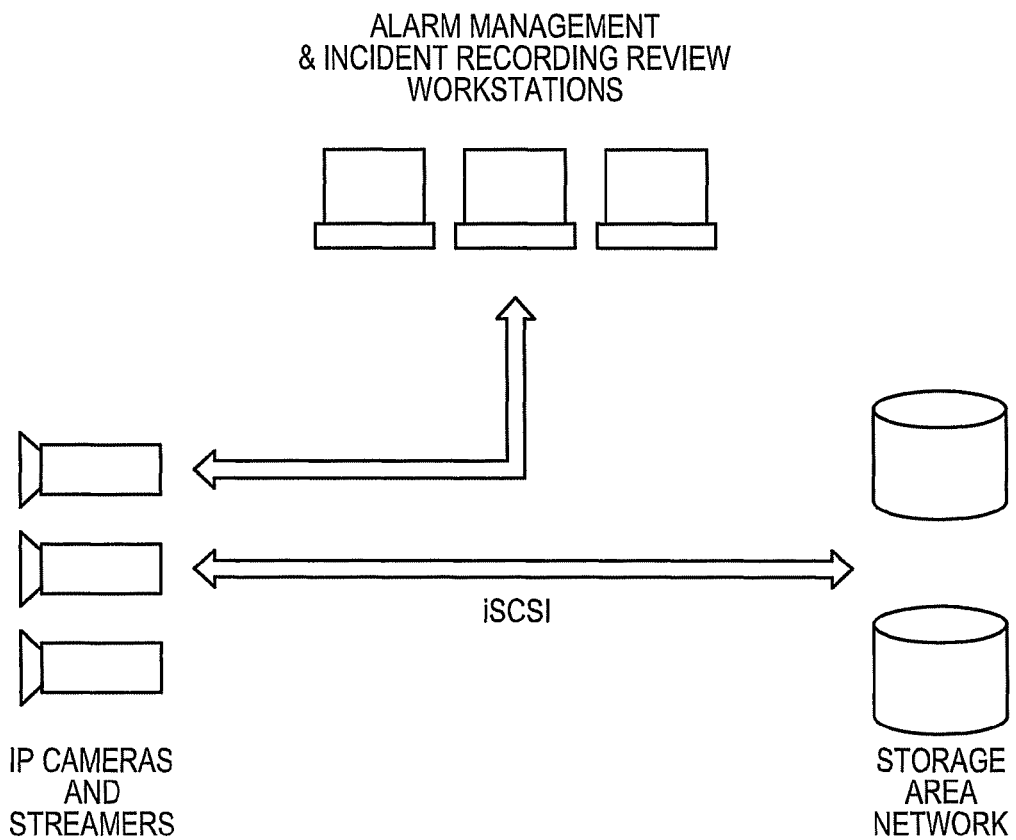
FIG. 3 is a block diagram of a known system that records directly into storage area networks.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

The problems of the existing systems can be addressed by a surveillance system, in accordance herewith, which does not include NVRs. This solution has advantages over and is unlike the prior art in that the IP Cameras and client applications directly access storage to record and retrieve video and audio data, respectively, and it incorporates database server technology for the centralized management and search functions of the video and audio recordings.

Simple and complex triggers can be generated internally by an IP Camera or Streamer, generated externally by the database application, or a user query or input, and sent to a camera, in order to initiate the recording of video and audio data. IP cameras and streamers can also be configured to perform continuous recording of video and audio data in a region being monitored without the need for triggers.

The IP cameras and streamers report the meta-data to a database server along with the data's globally unique file name (for file server storage systems) or the data's globally unique object identifier (for object based storage systems) and record video and audio data (e.g., MP4 Clips) directly to storage. Examples of meta-data include:
  a. IP camera or streamer identifiers;
  b. Priority levels;
  c. Internal or external trigger sources, along with respective dates and times; and
  d. Start and length of video and audio data.

Workstation based client applications query the meta-data via the database server for video and audio recordings and then directly retrieve the recordings from media storage. Queries can be manually originated, or automatic.

The database server deletes recordings in order to manage the overall storage requirements and centrally hosts the systems configuration management. This approach dramatically reduces system complexity, management and cost of ownership by: Enabling a much higher density ratio of cameras to computing platforms (100s of cameras to one database server) than NVRs using traditional file-based storage systems that results in far fewer high-end computing platforms. More fully exploiting the capabilities of Object based storage systems than NVRs allowing a further increase in the density ratio of cameras to computing platforms. Retaining centralized search services for ease of client use. Retaining a centralized model for ease of systems configuration and management.

A central database server also provides opportunity for more intelligent storage management than individual cameras by including system wide parameters and meta-data in the decision criteria. For example, alarm generated clips can be kept longer than continuous recordings or those for which the meta-data match a specific criteria can be kept longer than the default.

Storing the meta-data with the recordings in media storage servers allows the database server to test the integrity of media storage (detect missing or lost recordings) and also facilitates rebuilding the database using the meta-data from media storage.

Although low-latency real time video and audio streaming can be directly streamed from the IP Cameras and Streamers to client workstations, this system also provides for time delayed video and audio (measured in a few to 10s of seconds) to be streamed directly from media storage to client workstations.

Figure 4:
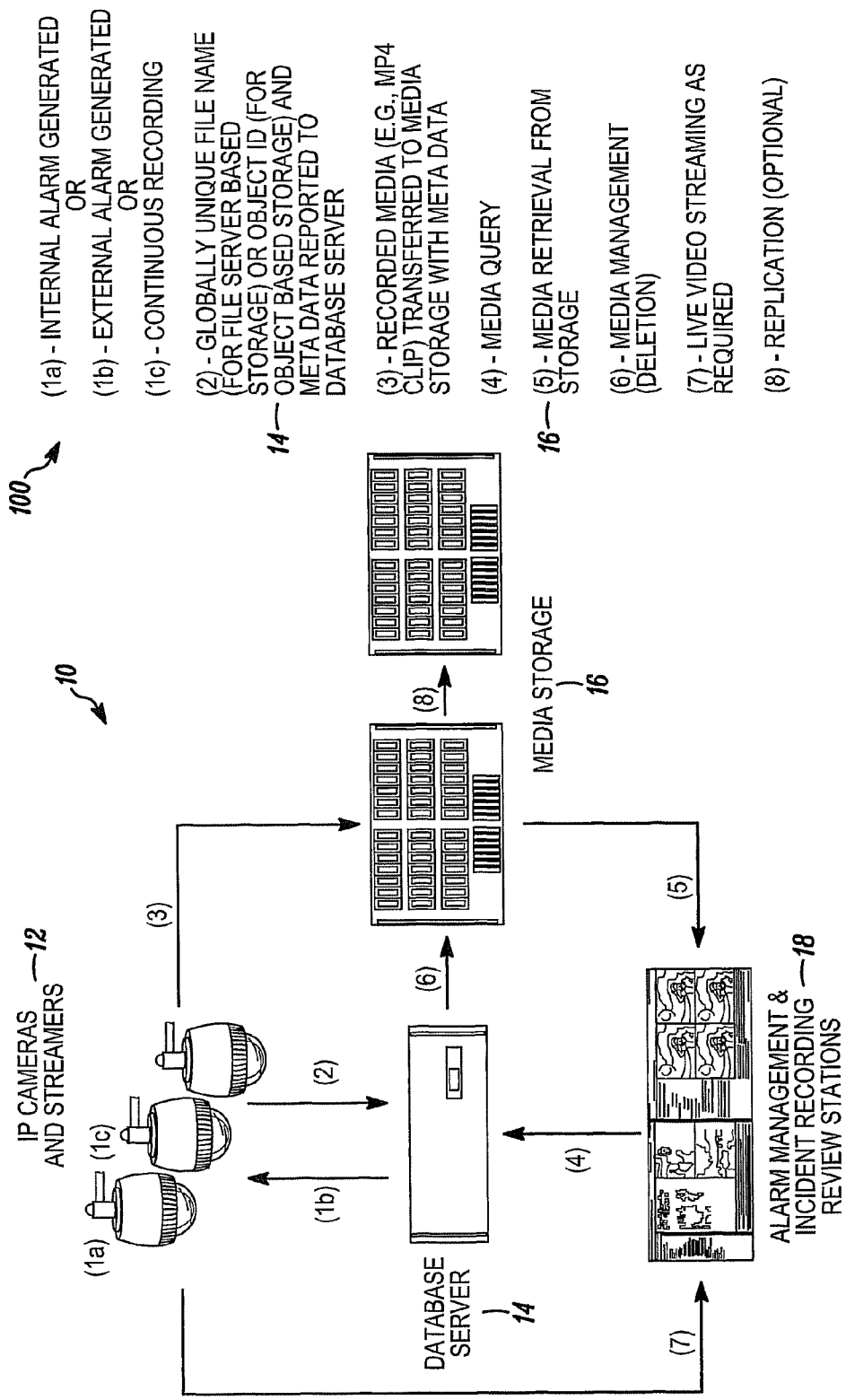
FIG. 4 is a block diagram of a system in accordance herewith.

FIG. 4 illustrates a system 10 of the type described above. In system 10, pluralities of IP cameras and/or streamers 12 are coupled to one or more database servers, indicated at 14, and to media storage 16. As illustrated in FIG. 4 outputs from cameras or streamers in pluralities 12 are coupled directly to media storage 16. No NVRs are interposed between sources 12 and storage units 16.

The server(s) 14 are also coupled to the storage units 16 and to user workstations 18. The workstations 18 are also coupled to storage units 16.

Figure 5:
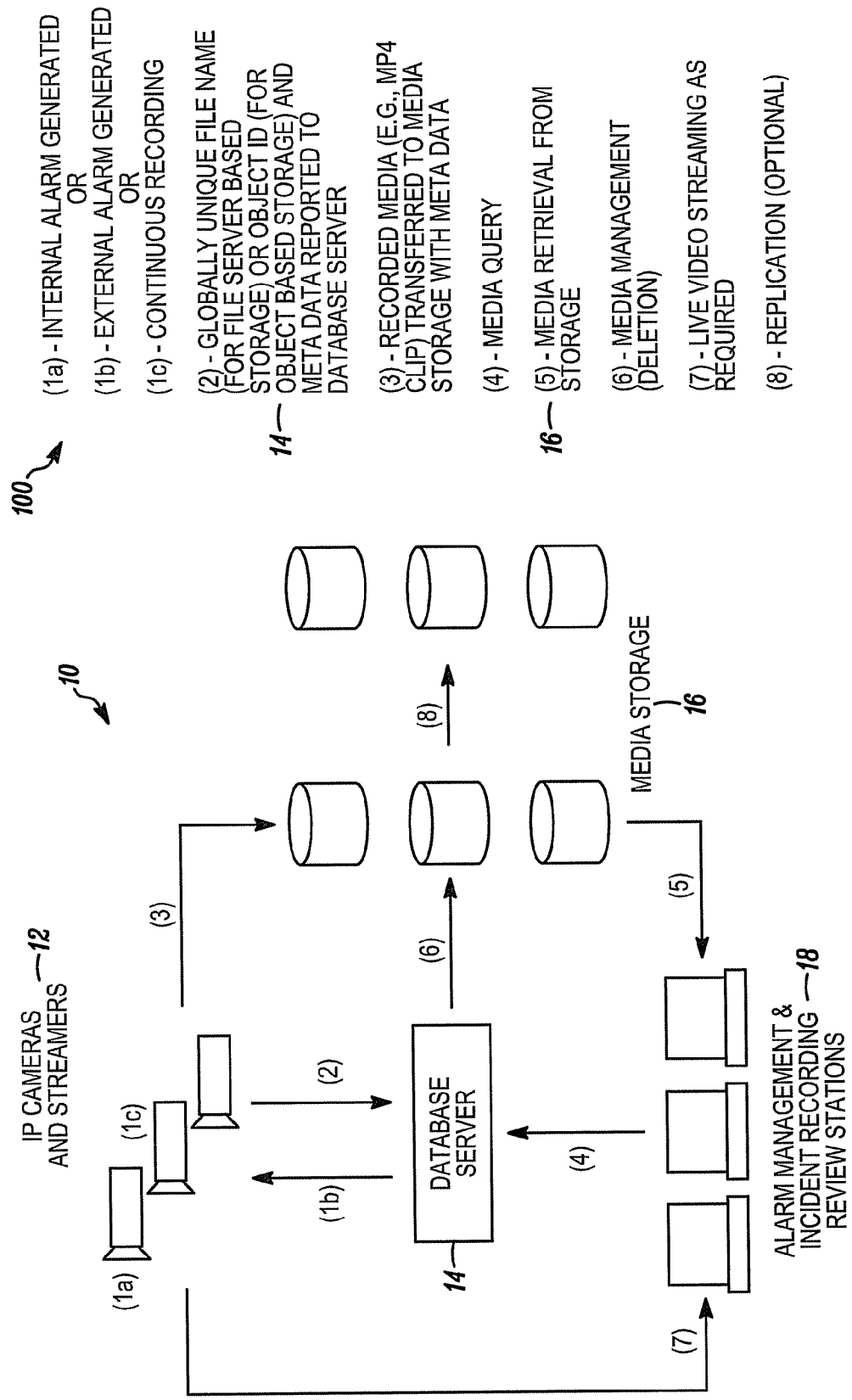
FIG. 5 is a diagram illustrating additional aspects of an embodiment hereof.

Coupling the server(s) 14 between inputs 12, storage units 16 and workstations 18 provides efficient centralized management and search functions of the video and audio recordings. The video and audio data, from sources 12 is recorded on storage units 16 and the associated meta-data communicated to server(s) 14. Client applications running on one or more of the workstations 18 can query the meta-data, via the server(s) 14 for stored audio or view recordings. Those recordings can be retrieved directly from storage units 16 for review and monitoring at the requesting workstation 18. FIG. 5 illustrates additional aspects of a method 100 of operation of the system 10.

In summary, method 100 can implement the following exemplary functionality starting with System Initialization:
  1. Database Server 14
    a. Opens the metadata repository
       i. If the database does not exist, it is created with default parameters
    b. Creates a "stream service" factory that will accept new tcp connections from IP Cameras.
    c. Creates queues of "storage handlers", one queue per storage server. Each storage handler establishes a tcp connection to its respective storage server. Storage handlers are used to delete clips from the storage servers.
  2. IP Camera, from plurality 12
    a. Establishes a tcp connection with the database server
    b. Send a request to the database server to acquire its configuration information.
       i. The request includes the unique "stream" identifier. The identifier is composed of the IP Camera's MAC address suffixed with a stream number of zero.
  3. Database Server 14
    a. Stream factory receives the request and spawns a "stream handler" to manage all requests for this specific stream identifier for the life of the TCP connection with the camera.
    b. Stream handler looks up the streams configuration in the database using the unique identifier provided. The configuration includes the recording parameters: clip container type (e.g., mp4), encoding type (e.g., H.264), image size, image rate, quality, and clip interval.
       i. If located, the configuration information is returned.
       ii. If not located, the stream is added to the database and a default configuration is returned.
  4. IP Camera
    a. Receives the configuration parameters.
    b. Established a tcp connection to the specific storage server as indicated in the configuration.
       A Recording Cycle for each Camera of the plurality 12:
  5. IP Camera
    a. Begins recording a clip based on the configuration provided.
    b. When the interval is reached, the recording of the next clip is started and runs concurrently with the storage of the existing clip.
    c. Requests an object identifier from the object server. The object identifier is globally unique.
       i. The request also includes the clip's metadata: stream identifier, start time, end time, container format (e.g., mp4), and size in bytes.
  6. Storage Server 16
    a. Receives the camera's request.
    b. Creates a unique object identifier and records the metadata.
    c. Returns the object identifier to the camera
       i. The object identifier and associated metadata is automatically deleted if the camera fails to provide the media within a specific time limit. This prevents orphaned object identifiers in the event of a camera or system failure.
  7. Camera
    a. Receives the object identifier from the storage server.
    b. Sends a request to the database server to record the clip's object identifier and metadata.
  8. Database: Stream Handler
    a. Receives the cameras request to record a clip's object identifier and metadata. The request also includes the stream identifier.
    b. Looks up the stream in the database and retrieves its recording information. This information includes a storage quota for this stream and its current storage capacity used.
    c. If the current storage capacity used plus the size of the new clip to be added exceeds the storage quota:
       i. Retrieves a set of clip object identifiers (in this case the oldest ones) that are required to be deleted from storage in order that the new clip can be added.
       ii. Acquires a storage handler from the respective queue for this stream's storage server and provides it with the list of clips (object identifiers) to be deleted.
       iii. For each clip to be deleted:
          1. Database: Storage Handler
             a. Sends a request to delete a clip to the storage server. The request includes the clip's object identifier.

2. Storage Server
   a. Receives the request and extracts the clip's object identifier.
   b. Deletes the clip: object identifier and the associated meta-data and media.
   c. Returns a response.
3. Database: Storage Handler
   a. Receives the response.
   iv. (Above could be optimized as a single request containing multiple clip object identifiers.)
   v. Deletes the set of clip object identifiers and related metadata from the database.
   vi. Updates the storage capacity used.
   vii. Returns a response to the camera.
9. Camera
   a. Receives the response to record the clip's object identifier and metadata from the database server.
   b. Send a request to the storage server to record the clip. The request includes the object identifier (previously acquired) and the clip.
10. Storage server 16
   a. Receives the request to record a clip from the camera
   b. Stores the clip to the associated object identifier provided.
   c. Returns a response to the camera.

Additional aspects of system 10 can include:

IP Cameras can be any recording device including IP based multi-channel streamers and digital video recorders (DVRs).
   For multi-channel devices, the system would handle each channel as a individual stream with the stream number (as part of the device's unique identifier) differentiating each channel.
   Likewise, it is possible have multiple streams on an IP Camera or for each channel on a multi-channel streamer. The device would follow some convention using the stream number in the device's identifier to make each stream unique.

File based storage servers can replace Object based storage servers
   As an alternate, file based servers can be used in place of an Object based server.
   The File server can included an application that provides the same services as the Object server described above.
   Alternately it is not necessary to have the clip's metadata stored in the file server.
   An option to have the recording device generate a unique clip "object identifier" can be used to eliminate the need to have one provide by the file server thus shorting the system's overall transaction requirements.
      The identifier used can be based on the camera's stream identifier suffixed with date (y/m/d) and time (h:m:s.ms) of the clip.

Event based recording mode
   In this mode, the system would record clips based on the generation of an alarm.
   The alarm could be generated internally by the recording device (e.g., activation of a general purpose input connected to an alarm panel or an internally generated motion detection event.
   The alarm could also be generated from an external source (e.g., a user pressing a GUI based alarm button on video management system.)
   The clip could contain pre and post event media. This could be accomplished in two ways:
      The camera records multiple clips in a pre-event buffer, records more clips post event, and sends all of the clips to storage.
      The cameras record in time-lapse mode and the database server deletes recordings that lay outside the time window of an event.

Storage Capacity Management
   In one aspect, the oldest clip(s) can be deleted in order to provide room for a new clip.
   The criteria for selecting clips to delete could be more complex and rule based. (e.g., important clips could be marked as permanent or clips associated with an event could all be deleted at once.)

Database Replica
   Preferably a database replica could be provided for data redundancy.

Video Management System
   Web based applications can be provided to facility user access to stored audio or video. For example, an application can be provided to enable an end user, via one of the workstations 18, to select a set of clips for a particular camera and retrieve the clips from media storage 16.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A surveillance system comprising:
a plurality of cameras;
a storage unit which receives and stores at least video signals from the cameras; and
a database control system coupled to the cameras and to the storage unit, wherein to initiate a recording of video data, a camera of the plurality of cameras establishes a tcp connection with the database control system and reports metadata of the recording to the database control system, the camera sends a request to the database control system to acquire the camera's configuration information, then establishes a tcp connection with a specific storage server of the storage unit as indicated in the configuration information and records the video data directly to the storage unit based upon the configuration information provided,
where the control system searches video signals stored in the storage unit in response to a user's query, where workstation based client applications query the database control system for recordings via the metadata and then directly retrieve the recordings from the storage unit.

2. A system as in claim 1 which includes a plurality of user input units, coupled to the database control system, wherein the query is manually entered into one of the user input units and executed by the control system.

3. A system as in claim 2 which includes circuitry to select and initiate operation of a camera.

4. A system as in claim 3 wherein selected information relative to video and audio data from an operating camera is stored in the storage unit.

5. A system as, in claim 4 where the selected information comprises metadata.

6. A system as in claim 2 wherein the query from a user input unit causes the control system to retrieve selected, stored video from the storage unit.

7. A system as in claim 1 where the storage unit stores audio signals in addition to the video signals and the database control system comprises a data base server to implement centralized management and search functions of video and audio stored in the storage unit.

8. A video surveillance system comprising:
at least one of a camera and a streamer;
a data base server that stores metadata for a video clip from the at least one of the camera and the streamer; and
a media storage server coupled to the at least one of the camera and the streamer and to the data base server,
wherein to initiate a recording of the video clip, the at least one of the camera and the streamer establishes a tcp connection with the data base server and the data base server receives the metadata, the one of the camera and streamer sends a request to the data base server to acquire configuration information of the one of the camera and the streamer, then the one of the camera and the streamer establishes a tcp connection with a specific storage server of the media storage server as indicated in the configuration information and directly stores the video clip from the at least one of the camera and the streamer within the specific storage server of the media storage server and in the absence of any intervening recording device, and
wherein the data base server searches video clips stored on the storage server in response to a user's query, where workstation based client applications query the data base server for recordings via the metadata and then directly retrieve the recordings from the media storage server.

9. A system as in claim 8 which includes circuitry to generate a trigger which activates the at least one of the camera and the streamer to obtain the video clip therefrom, wherein metadata for the video clip is stored on the data base server.

10. A system as in claim 9 which includes a user station coupled to the data base server and to the media storage server, wherein a query entered at the user station causes the data base server to retrieve the video clip from the media storage server.

11. A system as in claim 10 where the media storage server receives and stores audio clips, and wherein, in response to a query from the user station, the data base server retrieves a selected audio clip from the media storage server.

12. A system as in claim 11 where the data base server implements centralized management and search functions of video and audio clips stored in the media storage server.

13. A method of acquiring at least one video-clip comprising:
a camera at least intermittently obtaining video indicative of a region being monitored;
obtaining metadata associated with the video;
the camera establishing a connection with a first server and reporting the metadata;
the camera storing the metadata on the first server;
the camera sending a request to the first server for the camera's configuration information;
the camera establishing a direct connection with a second different server as indicated by the configuration information;
the camera storing at least the obtained video on the second, different server;
the first server receiving a user query for the stored video where workstation based client applications query the first server for recordings via the metadata;
responding to the user query, where responding includes the workstation based client applications directly retrieving the stored video from the second, different server; and
visually presenting the retrieved video.

14. A method as in claim 13 which includes coupling the servers together and coupling each server to a source of the video.

15. A method as in claim 13 which includes obtaining audio and storing the obtained audio on the second, different server, where the first server implements centralized management and search functions of video and audio clips stored on the second, different server.

* * * * *